Oct. 6, 1964    M. J. ZUNICK    3,151,967
METHOD OF SEAL-OFF FOR LOW PRESSURE TUBES
Filed Jan. 18, 1960
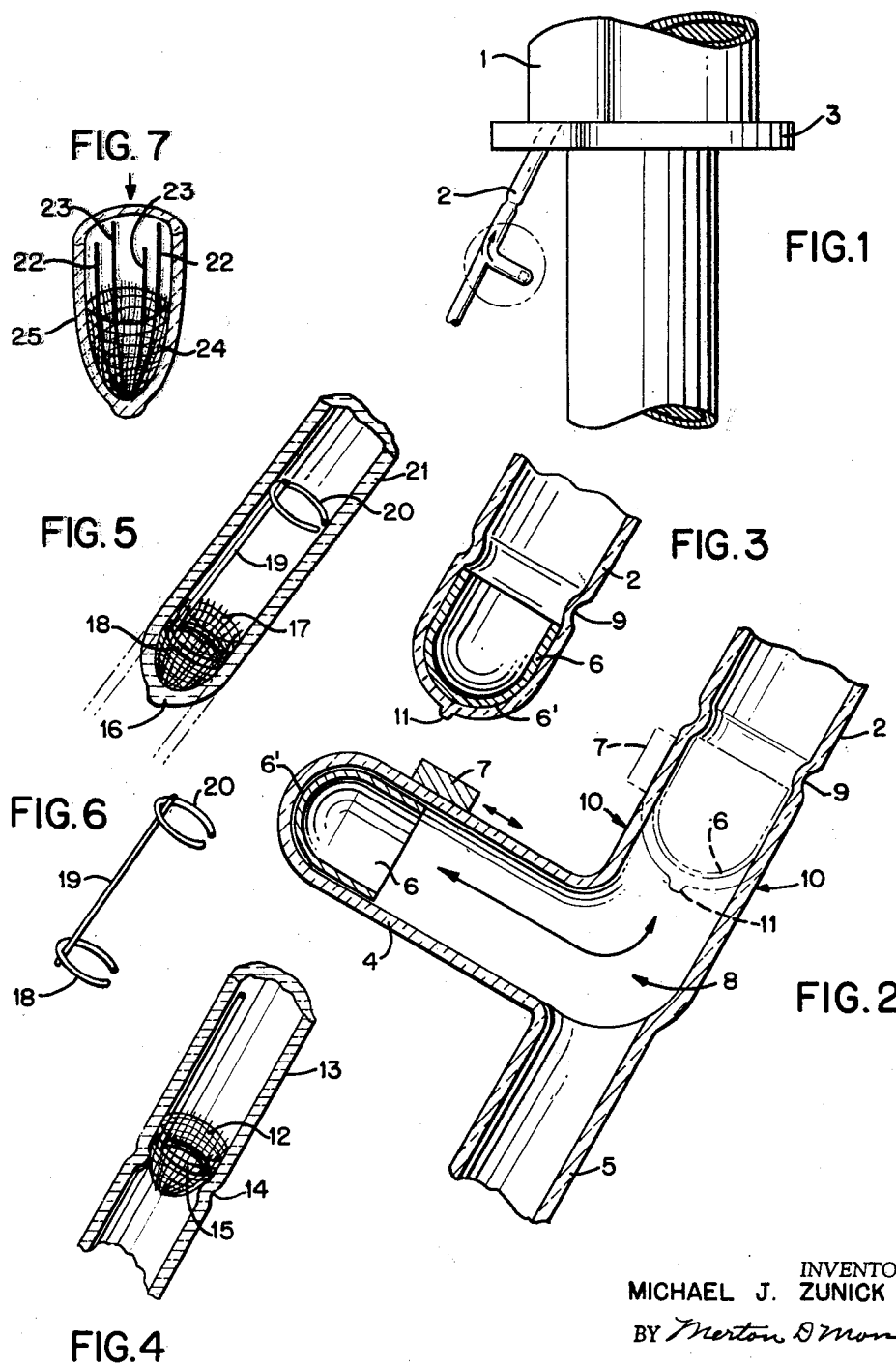
INVENTOR.
MICHAEL J. ZUNICK
BY Merton D Moore
ATTORNEY United States Patent Office 3,151,967
Patented Oct. 6, 1964

3,151,967
METHOD OF SEAL-OFF FOR LOW
PRESSURE TUBES
Michael J. Zunick, West Allis, Wis., assignor to General
Electric Company, a corporation of New York
Filed Jan. 18, 1960, Ser. No. 2,728
2 Claims. (Cl. 65—34)

This invention relates to a low pressure or vacuum tube seal-off, and more particularly, to the seal-off of tubes having a large size. The invention also relates to a method for making a low pressure tube seal-off.

For the manufacturing of large size low pressure tubes it is desirable to have the exhaustion carried out at a high speed. Usually, a small glass evacuation tube is attached to the low pressure tube before exhaustion, and through this small tube the air is pumped out. It has been found that the air or gas conductance of such evacuation tube increases non-linearly with an increasing diameter of the tube. Thus, an increased diameter will greatly increase the rapidity of evacuation. On the other hand, the larger the diameter of this evacuation tube is, the more difficult is its sealing off. It is a known phenomenon that during the softening-fusing process of making the seal at the evacuation tube for closing the low pressure tube, the softened glass collapses under the outside pressure and air is sucked in. The maximum diameter for a tube that can be manipulated by a very highly skilled glass worker without fear of this "sucking in" does not exceed about $3/8''$. If one could for example double this diameter, the conductance of gas therethrough would be increased by about 10 times. Even a lesser increase of the diameter would greatly increase the speed of evacuation. For example, it would be of advantage if an evacuation tube of, for example, only $1/2''$ diameter could easily be sealed off by a glass-blower of average skill.

It is an object of the invention to facilitate the sealing off of low pressure tubes and to increase the diameter of evacuation tubes attached thereto, beyond the present day limit as hereinbefore indicated.

It is another object of the present invention to provide a new and improved seal-off structure for low pressure tubes.

It is another object of the invention to provide for a new method for obtaining a vacuum seal of an evacuation glass tube having a diameter larger than presently used.

It is another object of the present invention to provide a new and improved structure for an evacuation tube.

According to one aspect of the present invention, a preferred embodiment thereof includes a glass evacuation tube which is attached to the low pressure or vacuum tube and extends outwardly therefrom. This glass evacuation tube houses a cup-shaped member or cap, preferably made of metal. This cap serves as a seal-off aid, and it is preferably positioned in a closed side arm or projection of the glass tube before and during the evacuation. After completion of evacuation, the cap then is moved into the evacuation path, against an internal indentation, preferably from the outside by means of a magnet. Thereafter the seal is effected by heating the glass from the outside near the bottom of this cap, whereby the latter forms a support for the softened glass which is then permitted to flow around the outer surface of the cup for the seal. There is no danger now that the softened glass will collapse under the outside air pressure but it will merely be pressed against the cap. In accordance with other aspects of my invention the seal-off aid cap may take the form of a wire-mesh basket positioned directly in the main path of the evacuation tube.

While the specification concludes with claims particularly pointing out and distinctly claiming the subject matter which is regarded as the invention, it is believed that the invention, the objects of the invention and further objects and advantages thereof will be better understood from the following description taken in connection with the accompanying drawing in which:

FIG. 1 shows a portion of a low pressure tube having an evacuation tube incorporating one embodiment of the invention;

FIG. 2 is a sectional view of the encircled portion of the evacuation tube shown in FIG. 1;

FIG. 3 illustrates the finished seal-off when a device shown in FIGS. 1 and 2 is used;

FIG. 4 is a sectional view of an evacuation tube according to another embodiment of the invention, showing a modified seal-off aid;

FIG. 5 is a sectional view of a finished seal-off according to a simplified structure for the evacuation tube, as shown in the preceding figures;

FIG. 6 shows in detail a portion of the structure shown in FIG. 5, and

FIG. 7 is a sectional view of an evacuation tube similar to the one shown in FIG. 5 but having a modified seal-off aid.

In FIG. 1 of the drawing, there is shown a portion of a low pressure tube 1 which is to be exhausted and sealed. A small evacuation tube 2 made of glass is attached to header 3 of the low pressure tube, and it is projecting outwardly therefrom. This tube 2 is to have an inner diameter as large as possible to increase the rapidity of the evacuation, for example, $1/2''$ and $5/8''$. For evacuating tube 1, a pump (not shown) is to be connected to the lower portion of tube 2.

Turning now to the enlarged portion of tube 2 illustrated in FIG. 2, there is shown an L-shaped side arm 4 integral with and projecting from tube 2. The evacuation takes place through portion 5 of tube 2 thus bypassing the arm 4. A cap or cup-shaped member 6 is housed before and during evacuation inside of arm 4. This cap 6 preferably is made of magnetizable material, for example, Kovar steel, and it may be moved from the outside by magnetic means indicated by the magnet 7.

In this embodiment of the invention the cap 6 is to fit reasonably closely to the wall of the side arm 4 as well as the wall of the tube 2 in order to keep its position at the end of side arm 4 until set into motion by magnetic forces applied at the outside. Thus, the cap is preferably made of material selected so as to closely match the thermal expansion characteristics of the glass with which it is used so that little or no strain is introduced by the cap when it is positioned adjacent glass portions which are to be cooled. Cap 6 includes a round bottom portion 6' forming approximately a semispherical outer surface.

When the evacuation is completed, cap 6 is moved in and along arm 4, following the arrow shown therein and then it is turned and moved, in the drawing, upwardly into tube 2. It will be appreciated that the knee-portion 8 where the arm 4 is attached to tube 2 must be wide enough to permit a turning of the cap 6 into tube 2. Finally, cap 6 comes to rest at a circular indentation 9 of tube 2. This indentation serves to predetermine the final position of cap 6, as it can be seen, it thus determines the position of the final seal-off. Dash-dot lines denote the position of cap 6 when resting at indentation 9. To accomplish the seal, the glass of tube 2 is softened in the area indicated by arrows 10 and the seal 11 is formed as shown in a dash-dot line in FIG. 2 or as shown directly in FIG. 3. Cap 6 forms a support for the glass when softened, and the soft glass may be pressed by the outside air against cap 6 but the glass will not collapse under the air pressure. Thus, there is no danger of sucking in of air. The seal then will cover at least the outer bottom surface of cap 6; dependent upon the extent of the softening during the making of the seal and the size of the gap between cap 6 and tube 2, part of the side of cap 6 may also be covered by the seal. After completion of the seal, the arm 4 and the remaining portion 5 of the tube are removed.

It will be appreciated that the movability of cap 6 in arm 4 and in tube 2 in general is determined by the width of cap 6 as compared with the inner diameters of arm 4 and tube 2, and it is further determined by the width of the knee portion 8. Instead of having a reasonably close fit between the cap 6 and the arm 4 and tube 2, the cap 6 may be made freely movable in arm 4 and tube 2 when arm 4 is directed downwardly. By proper turning of the entire tube, cap 6 may be moved simply by gravity until it rests against identation 9. In this case, cap 6 need not be of magnetizable metal, but it can be made of any hard material having a melting point well above the softening point of glass. Most metals or ceramics comply with this condition.

It will be appreciated that a magnetically movable cap is the preferred means to carry out the invention if the tube is to be evacuated to a very low pressure. In this case, the evacuation pump is a highly effective, sensitive and large device, whereby preferably no flexible connection is used. The tube carrying the evacuation tube is rigidly attached to the pump. Thus, this tube could not readily be turned to have the cap moved therein by gravity. However, if, for example, a flexible connection could be employed between the tube and the pump, a non-magnetizable cap to be moved by gravity could be used.

From the foregoing, it will have become apparent that arm 4 serves as a temporary housing for the cap 6, which cap is placed into the evacuation path after evacuation. Furthermore, the only requirements for the cap are its movability from the outside and a round bottom portion for support of the softened glass. It is not required that this cap be of solid material but it may be pervious. This possibility leads to other embodiments of the invention as shown in FIGS. 4 to 7, according to which the arm 4 may be omitted and the cap is placed in the evacuation tube prior to the evacuation, and the exhaustion takes place through the pervious cap. While a cap in this position may interfere to some extent with the flow of gas during evacuation, the greatly increased diameter of the evacuation tube permitted by utilization of the principle of my invention still permits a significant increase in the speed of evacuation over that afforded by prior art structures, despite the resistance to air flow afforded by the pervious cap. While the form of invention shown in FIGS. 1–3 is my preferred embodiment because no resistance to air flow through the evacuation tube is encountered during evacuation, the modified form shown in FIGS. 4–7 has the advantage of avoiding the necessity of a special evacuation tube including the side arm 4.

In FIG. 4, cap 12 has a form similar to a basket and made of mesh wire. Cap 12 is positioned inside of an evacuation glass tube 13 which is attached to a vacuum or low pressure tube in the same manner as tube 2 in FIG. 1 connected to tube 1. An indentation 14 in tube 13 serves as a stop for cap or basket 12 thereby positioning the cap 12 in the desired location for the later sealing operation. A ring-shaped spring 15 inside of cap 12 serves as frictional support thereof. Upon completion of the evacuation which takes place through the holes of cap 12, the glass is softened at areas indicated by the arrows adjacent indentation 14, and the tube 13 will be sealed. The glass when softened for sealing is not heated to such a degree that it becomes low viscous fluid, thus there is no danger that it may drop through the holes of the cap but it rests as a whole plastic mass against the wires of the cap.

FIG. 5 shows that even an indentation such as 14 in FIG. 4 may be avoided and the evacuation tube made as an ordinary straight glass tube. In the form shown in FIG. 5, a cap 17 is also made of mesh wire in a basket-like shape similar to cap 12 in FIG. 4. A ring-shaped spring 18, corresponding generally to the spring 15 of the form shown in FIG. 4, is associated with the cap 17. A longitudinally extending wire 19 is supported from the spring 18, and the wire 19 supports at its outer end a second ring-shaped spring 20. Springs 18 and 20 with supporting wire 19 are shown separately in FIG. 6. The spring 20 presses against the wall of the evacuation tube 21 in frictional engagement therewith and thus supports the cap 17 at the desired position in the evacuation tube adjacent seal 16. The spring 18, as in the form shown in FIG. 4, presses the cap 17 against the wall of the evacuation tube 21 to further assist in maintaining the cap 17 in position during the evacuation process.

In FIG. 7 is shown another way to support a mesh wire cap in the glass tube. Two U-shaped resilient wires 22 and 23 are positioned in perpendicular planes and touching apices, and the mesh wire cap 24 is placed thereon. Cap 24 thus becomes stretched and presses against the glass wall of tube 25. The outer portions of the wires 22 and 23 directly frictionally engage tube 25. The cap may easily be pushed inside of tube 25 in the direction of the arrow before the seal is made, whereby it slides in the desired position and is kept there by frictional forces exerted from wires 22 and 23 against the tube wall. In addition, the wires 22 and 23 serve as sturdy support for the mesh wire cap during the sealing, which in turn means that the cap can be made of very thin wire and the whole structure still is a sufficient support for the softened glass during the sealing step. A thin wire mesh, of course, serves to lessen the decrease of the evacuation speed when the cap is placed in the evacuation path during exhaustion.

It will be appreciated that the invention may not only be used immediately after evacuation of a tube, but it can be used even when, before sealing, another gas (helium, hydrogen, mercury vapor, etc.) is pumped into the tube.

The invention is not limited to the embodiments described above but all changes and modifications thereof not constituting departures from the spirit and scope of the invention are intended to be covered by the following claims.

What I claim as new and desire to secure by Letters Patent of the United States is:

1. A method for sealing off a low pressure tube having an outwardly extending evacuation glass tube, with a side arm housing cap, comprising the steps of evacuating said low pressure tube, moving the cap from a position in the side arm to a position in the evacuation path of the evacuation tube, softening the glass of said last-mentioned tube, causing said softening glass to flow around the bottom of said cap, and removing said side arm.

2. A method for sealing off a low pressure tube having an outwardly extending evacuation glass tube with a side arm housing a cap of solid magnetizable material, comprising the steps of, evacuating said low pressure tube, moving magnetically said cap from a position in the side arm to a position in the evacuation path of the evacuation tube, softening the glass of said last-mentioned tube, causing said softening glass to flow around the bottom of said cap, and removing said side arm.

References Cited in the file of this patent

UNITED STATES PATENTS

| | | |
|---|---|---|
| 751,918 | Jagger | Feb. 9, 1904 |
| 1,155,852 | Westergren | Oct. 15, 1915 |
| 2,496,303 | Morse | Feb. 7, 1950 |
| 2,576,168 | Allen | Nov. 27, 1951 |
| 2,649,993 | Burdick et al. | Aug. 25, 1953 |